(12) United States Patent
Picard et al.

(10) Patent No.: US 10,193,186 B2
(45) Date of Patent: Jan. 29, 2019

(54) ELECTROLYTE ADDITIVE FOR LITHIUM-ION BATTERY

(71) Applicant: Commissariat A L'Energie Atomique Et Aux Energies Alternatives, Paris (FR)

(72) Inventors: Lionel Picard, Seyssinet-Pariset (FR); Gilles Moreau, Grenoble (FR)

(73) Assignee: COMMISARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 139 days.

(21) Appl. No.: 15/037,450

(22) PCT Filed: Nov. 17, 2014

(86) PCT No.: PCT/IB2014/066099
§ 371 (c)(1),
(2) Date: May 18, 2016

(87) PCT Pub. No.: WO2015/075619
PCT Pub. Date: May 28, 2015

(65) Prior Publication Data
US 2016/0301100 A1    Oct. 13, 2016

(30) Foreign Application Priority Data

Nov. 20, 2013    (FR) ..................... 13 61387

(51) Int. Cl.
*H01M 10/0565* (2010.01)
*H01M 10/052* (2010.01)
(Continued)

(52) U.S. Cl.
CPC ..... *H01M 10/0565* (2013.01); *H01M 10/052* (2013.01); *H01M 10/0525* (2013.01); *H01M 10/0564* (2013.01); *H01M 10/4235* (2013.01)

(58) Field of Classification Search
None
See application file for complete search history.

(56) References Cited

U.S. PATENT DOCUMENTS 7,691,529 B2    4/2010  Hennige
2003/0099886 A1    5/2003  Choy
(Continued)

FOREIGN PATENT DOCUMENTS

EP    1530809 A2    3/2011
EP    2360014 A1    8/2011
(Continued)

OTHER PUBLICATIONS

He and Lodge, Chem. Commun. 2007 2732-34, A thermoreversible ion gel by triblock copolymer self assembly in an ionic liquid. (Year: 2007).*

(Continued)

*Primary Examiner* — Lucas J. O'Donnell
(74) *Attorney, Agent, or Firm* — Cooper Legal Group, LLC; Ronald M. Kachmarik

(57) ABSTRACT

Electrolyte for a lithium-ion battery comprising at least one block copolymer, characterized in that said block copolymer comprises at least one polymeric segment A which is soluble in said electrolyte and at least one polymeric segment B having a temperature for dissolution "T" in said electrolyte, the polymeric segments A and B being present in amounts sufficient to make possible an increase in the viscosity of the electrolyte, preferably up to gelling of the electrolyte, at a temperature greater than or equal to the temperature "T"; the ionic conduction is produced by a solvent comprising the copolymer and lithium salts.

19 Claims, 4 Drawing Sheets a)

b)

(51) Int. Cl.
  *H01M 10/0564* (2010.01)
  *H01M 10/42* (2006.01)
  *H01M 10/0525* (2010.01)

(56) References Cited

U.S. PATENT DOCUMENTS

| | | | |
|---|---|---|---|
| 2011/0294003 | A1 | 12/2011 | Zhang |
| 2011/0294017 | A1 | 12/2011 | Weng |
| 2011/0294018 | A1 | 12/2011 | Zhang |

FOREIGN PATENT DOCUMENTS

| | | | |
|---|---|---|---|
| EP | 2485297 | A2 | 8/2012 |
| JP | 2005310445 | A | 11/2005 |
| JP | 2010244943 | A | 10/2010 |
| WO | 2007142731 | A2 | 12/2007 |
| WO | 2009131961 | A2 | 10/2009 |
| WO | 2010101794 | A1 | 9/2010 |
| WO | 2013077211 | A1 | 5/2013 |
| WO | 2014130676 | A1 | 8/2014 |

OTHER PUBLICATIONS

He and Lodge, Macromolecules 2008 41(1) p. 167-74, Thermoreversible ion gels with tunable melting temperatures from triblock and pentablock copolymers (Year: 2008).*

Lee and Lodge Journal of Physical Chemistry, 2011 p. 1971-77, Polu(n-butyl methacrylate) in ionic liquids with tunable lower critical solution temperatures (LCST) (Year: 2011).*

Lower Critical Solution Temperature Phase Behavior of Poly(n-butyl methacrylate) in Ionic Liquid MixturesMegan L. Hoarfrost, Yanpu He, and Timothy P. LodgeMacromolecules 2013 46 (23), 9464-9472DOI: 10.1021/ma401450w (Year: 2013).*

Lower Critical Solution Temperature (LCST) Phase Behavior of Poly(ethylene oxide) in Ionic LiquidsHau-Nan Lee and Timothy P. LodgeThe Journal of Physical Chemistry Letters 2010 1 (13), 1962-1966DOI: 10.1021/jz100617t (Year: 2010).*

Byeongmoon Jeong et al. "Thermosensitive sol-gel reversible hydrogeis." Advanced Drug Delivery Reviews, Elsevier Amsterdam, NO, vol. 54, No. 1, Jan. 17, 2002, pp. 37-51.

International Search Report for PCT/IB2014/066099 dated Feb. 25, 2015.

Hai-Hui Lin et al. "In-Situ Thermoreversible Gelation of Block and Star Copo9lymers of Poly(ethylene glycol) and Poly (N-isopropylacrylamide) of Varying Architectures", Macromolecules, vol. 34, No. 11, May 1, 2001, pp. 3710-3715.

Yiyong He et al, "A thermoreversible ion gel by triblock copolymer self-assembly in an ionic liquid", Chemical Communications, No. 26, Jul. 1, 2007, pp. 2732-2734.

* cited by examiner a)

b)

c)

a)

b)

a)

b)

ELECTROLYTE ADDITIVE FOR LITHIUM-ION BATTERY

TECHNICAL FIELD

The present invention relates to the field of lithium electrochemical generators, which operate according to the principle of insertion or of deinsertion, or in other words intercalation-deintercalation, of lithium in at least one electrode.

It relates more particularly to a lithium electrochemical battery.

One of the main problems of Li-ion batteries is that they may be prone to thermal runaway or overheating.

Consequently, the majority of Li-ion batteries used comprise a means which makes it possible to render safe in the event of thermal runaway.

STATE OF THE ART

Provision has already been made to use separators in order to provide this function. One technology is targeted at using, as separator, a polymer which is porous under the normal conditions of use of the battery and which becomes nonporous, thus blocking the ionic conductivity, in the event of thermal runaway. Mention may be made, as examples of this technology, of:

EP 1 530 809, which relates to a battery containing a separator based on an electrically insulating porous inorganic layer covered with a coating of particles of waxes or polymers fusible at a given temperature corresponding to the overheating;

EP 2 485 297 A2, which relates to a separator for a secondary lithium battery comprising a base film made of polyethylene or polypropylene and a powder based on polyethylene or polypropylene;

EP 2 360 014 A1, which relates to an improved separator for a secondary lithium battery comprising a film based on polypropylene resin and a layer made of polyethylene resin.

Other solutions have been provided for protecting lithium batteries.

Thus, US2003/0099886 discloses the use of a nonaqueous electrolyte comprising an organic compound of diphenylene oxide type which, in the event of overheating of the battery, oxidizes and polymerizes to form a coating on the surface of the cathode. The polymer forming the coating makes it possible to create a short circuit between the cathode and the anode which results in the battery being protected.

US2011/0294003, US2011/0294017 and US2011/0294018 describe the use of redox shuttle molecules. These molecules exhibit the advantage of being able to be reversibly oxidized/reduced at a defined potential, slightly greater than the end-of-charge potential of the cathode. This property makes it possible to protect the cell and by extension the battery in the event of overcharge by blocking the potential of the cathode at a value corresponding to the oxidation potential of the shuttle molecules.

The main disadvantage of these technologies is that the blocking of the ionic conductivity is irreversible. Rendering the rechargeable battery safe admittedly makes it possible to avoid damage to the device containing this battery. However, the action in which the battery is put out of use is not reversible, while the battery does not necessarily exhibit an intrinsic problem: the overheating of the battery may, for example, be due to an occasional overcurrent demand.

There thus remains a need to have available a battery in which the ion flow is reduced, indeed even blocked, in the event of thermal runaway which may be restored when the battery has returned to a normal operating temperature.

Surprisingly and advantageously, the present invention is targeted at meeting this need.

DISCLOSURE OF THE INVENTION

According to a first subject matter, the present invention is targeted at an electrolyte for a lithium-ion battery comprising at least one block copolymer, characterized in that said block copolymer comprises at least one polymeric segment A which is soluble in said electrolyte and at least one polymeric segment B having a temperature for dissolution "T" in said electrolyte, the polymeric segments A and B being present in amounts sufficient to make possible an increase in the viscosity of the electrolyte, preferably up to gelling of the electrolyte, at a temperature greater than or equal to the temperature "T", and then the return of the electrolyte to a liquid state when the temperature of the battery falls back below "T".

According to the invention, said block copolymer is heat-sensitive.

Admittedly, the use of block copolymers in lithium batteries has already been described but, to the knowledge of the inventors, essentially for improving the ionic conductivity.

Thus, WO2010/101794 discloses an ionically conductive copolymer comprising ethylene oxide groups and its use in improving the ionic conductivity of a lithium battery at ambient temperature.

WO2009/131961 describes the use of a device in which the lithium anode is placed in an electrolyte comprising a nanostructured block copolymer, this device making it possible to retain the integrity of the anode.

WO2007/142731 discloses a polymer which combines a high ionic conductivity and the structural properties required in order to retain the integrity of the lithium metal anode, said polymer being used as solid-phase electrolyte.

It emerges from the above that the use as well as the chemical nature of the polymers under consideration according to the invention are different.

Thus, the copolymer used according to the present invention exhibits the property of making possible the increase in the viscosity, indeed even the gelling, of the electrolyte for a lithium-ion battery when the battery is brought to a temperature at least equal to the temperature "T" and then the return of the electrolyte to a liquid state when the temperature of the battery falls back below "T".

Said copolymer comprises at least one polymeric segment (B) which is insoluble in the electrolyte at a temperature of less than "T" but which becomes soluble at the temperature "T". Generally, the copolymer becomes soluble in the event of a sudden rise in the temperature, that is to say in the event of overheating of the battery.

Without wishing to be committed to any one theory, it appears that the dissolution of this polymeric segment in the electrolyte results in an expansion of the chains constituting this polymeric segment in order to form a three-dimensional network, by physical crosslinking, creating strong bonds, for example hydrogen bonds, whereas, at a temperature of less than "T", the polymeric segments are insoluble in the electrolyte; consequently, at this temperature, the chains are folded back over themselves, wound into balls.

According to another of its subject matters, the invention relates to a lithium-ion battery comprising the electrolyte according to the invention.

The present invention is also targeted at the use of at least one block copolymer as additive which modulates the ionic conductivity of the electrolyte of a lithium-ion battery as a function of the temperature of said electrolyte, characterized in that said block copolymer comprises at least one polymeric segment A and at least one polymeric segment B such that said polymeric segment A is soluble in the electrolyte and said polymeric segment B has a temperature for dissolution "T" in said electrolyte, the polymeric segments A and B being present in amounts sufficient to make possible an increase in the viscosity, preferably up to gelling, of the electrolyte at a temperature greater than or equal to the temperature "T" and then the return of the electrolyte to a liquid state when the temperature of the battery falls back below "T".

Advantageously, at the temperature T, the conductivity of the electrolyte passes from a value C1 ranging from $10^{-4}$ $S \cdot cm^{-1}$ to 0.1 $S \cdot cm^{-1}$ to a value C2 ranging from $10^{-6}$ $S \cdot cm^{-1}$ to $10^{-5}$ $S \cdot cm^{-1}$.

In addition, the invention relates to the use of at least one block copolymer as additive which modulates the viscosity of a fluid medium as a function of the temperature of said medium, characterized in that said block copolymer comprises at least one polymeric segment A and at least one polymeric segment B such that said polymeric segment A is soluble in the electrolyte and said polymeric segment B has a temperature for dissolution "T" in said electrolyte, the polymeric segments A and B being present in amounts sufficient to make possible an increase in the viscosity, preferably up to gelling, of the electrolyte at a temperature greater than or equal to the temperature "T" and then the return of the electrolyte to a liquid state when the temperature of the battery falls back below "T".

Other advantages, properties and characteristics will become apparent on reading the description and figures which follow.

DEFINITIONS

Polymer which is "soluble" in a solvent within the meaning of the present invention is understood to mean a polymer which, at a concentration of 0.1% by weight of active material in said solvent at 25° C., results in a macroscopically homogeneous solution or suspension which is transparent or translucent, that is to say having a transmittance value at a wavelength of 500 nm through a sample with a thickness of 1 cm of at least 70%, preferably 80%.

Polymer which is "heat-sensitive" within the meaning of the present invention is understood to mean a polymer, the properties of which, in particular with regard to the viscosity, will be modified as a function of the heat. The "heat-sensitive" nature of the polymers used according to the invention is essentially due to the presence of the polymeric segment (B) which has a dissolution temperature "T".

The temperature "T" defined in the context of the invention is the temperature of change of state of the electrolyte: gelling of the electrolyte begins from this temperature.

The polymeric segment (B) is chosen so as to adjust the temperature "T", which conditions the change in viscosity, to a value beyond which a risk of overvoltage, overheating or thermal runaway may be sensed.

Advantageously, the temperature "T" is less than or equal to 80° C.; preferably "T" ranges from 60° C. to 80° C. and more preferably from 70° C. to 80° C.

Preferably, the gelling of the electrolyte corresponds to a viscosity V at least greater than 10 Pa·s at 25° C. and preferably greater than 100 Pa·s at 25° C. and preferably again divergent (gelling).

As already mentioned, the electrolyte makes possible the ionic conductivity at a temperature of less than "T", whereas, at a temperature greater than "T", when the electrolyte is in the gelled form, the ionic mobility is reduced and, for this reason, the ionic conductivity decreases, indeed even is prevented.

Preferably, the electrolyte according to the present invention exhibits a conductivity C1 ranging from $10^{-4}$ $S \cdot cm^{-1}$ to 0.1 $S \cdot cm^{-1}$ at a temperature of less than "T".

Preferably, the electrolyte according to the present invention exhibits a conductivity C2 of less than $10^{-5}$ $S \cdot cm^{-1}$ at a temperature equal to or greater than "T".

As mentioned above, the block copolymer used in the present invention comprises at least one polymeric segment A which is soluble in said electrolyte and at least one polymeric segment B having a temperature for dissolution "T" in said electrolyte.

The block copolymer used according to the invention is advantageously electroinactive; it has substantially no effects on the performance of the battery under the normal conditions of use and in particular when the temperature of the battery is less than "T".

The block copolymer used according to the invention is chosen from alternating, random or comb block copolymers.

As already described, the block copolymer used comprises at least two polymeric segments (A) and (B) of different natures. The natures and the lengths of the polymeric segments are chosen as a function of the properties desired and in particular as a function of the electrolyte chosen; in particular the polymeric segments may be amphiphilic or of very similar nature. In addition, the natures and the lengths of the polymeric segments (B) are chosen as a function of the temperature "T" desired.

Thus, when the temperature "T" is reached, the polymeric segments B become soluble in the medium and the chains constituting these polymeric segments (B) unfurl, the physical interactions between the unfurled chains of the blocks providing the gelling of the electrolyte.

The block copolymers according to the invention are obtained from chain polymerization monomers. They are generally obtained by radical, anionic or cationic controlled polymerization (ATRP (Atom Transfer Radical Polymerization), ITRP (Iodine Transfer Radical Polymerization), RAFT (Reversible Addition-Fragmentation Chain Transfer), and the like). This is because these types of polymerization make it possible to obtain a specific geometry of the block copolymer, depending on the properties targeted.

More particularly, in addition to the modification to the properties of the copolymer at "T", it is also possible to envisage choosing polymeric segments in order to obtain a modification to the properties of said block copolymer as a result of a modification to pKa or pKb.

The appended figures exhibit several alternative forms of the block copolymers used according to the invention.

represented in c) is the diblock at a temperature greater than "T": the polymeric segment A (light) and the polymeric segment B (dark) are in the unfurled form.

Figure 1:
FIG. 1 exhibits a diblock copolymer:
represented in a) is the base diblock consisting of the polymeric segment A (light) and the polymeric segment B (dark), represented in b) is the diblock at a temperature of less than "T": the polymeric segment A (light) is unfurled and the polymeric segment B (dark) is in the folded back/wound into a ball form.
Figure 1:
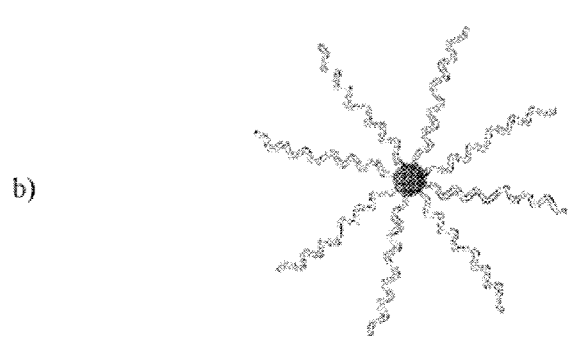
Figure 1:
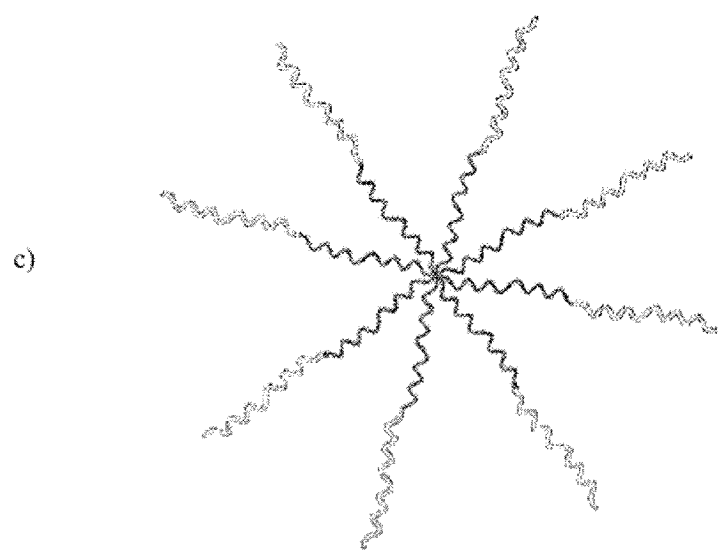
Figure 2:
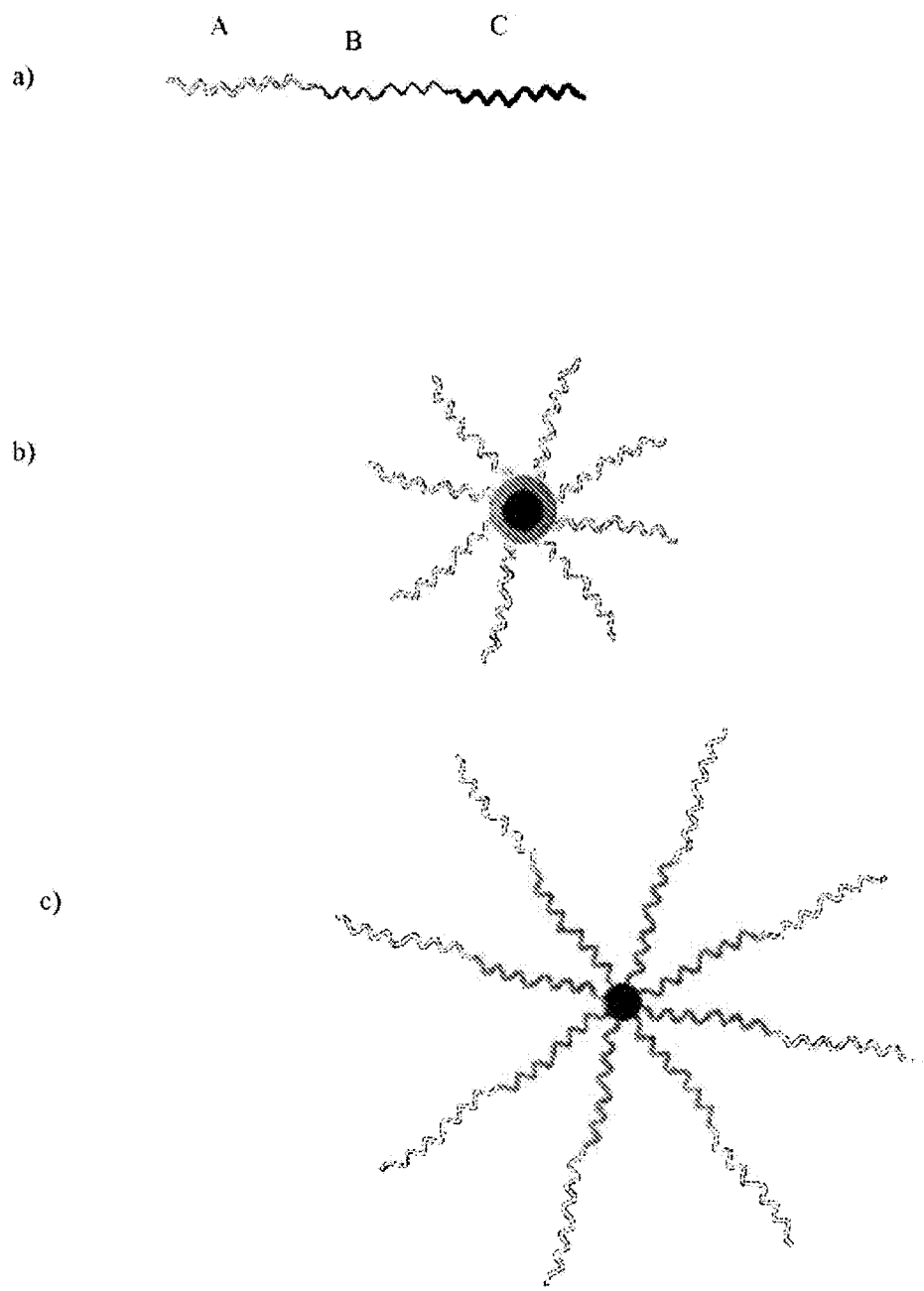

FIG. 2 exhibits a triblock copolymer:

represented in a) is the base triblock consisting of the polymeric segment A (light), the polymeric segment B (dark) and the polymeric segment C (black), represented in b) is the triblock at a temperature of less than "T": the polymeric segment A is unfurled, while the polymeric segments B and C are in the folded back/wound into a ball form, represented in c) is the triblock at a temperature greater than "T": the polymeric segments A and B are in the unfurled form, whereas the polymeric segment C is in the folded back/wound into a ball form.

Figure 3:
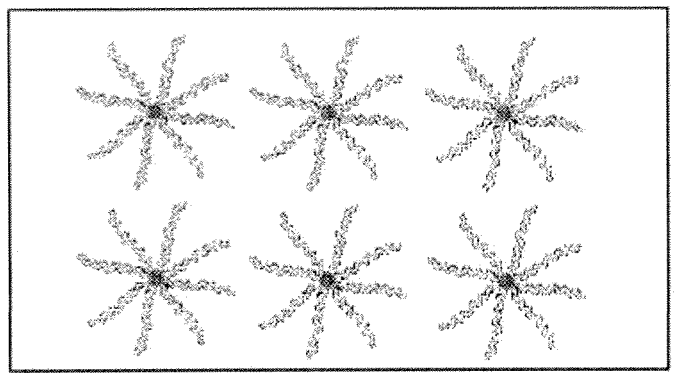
Figure 3:
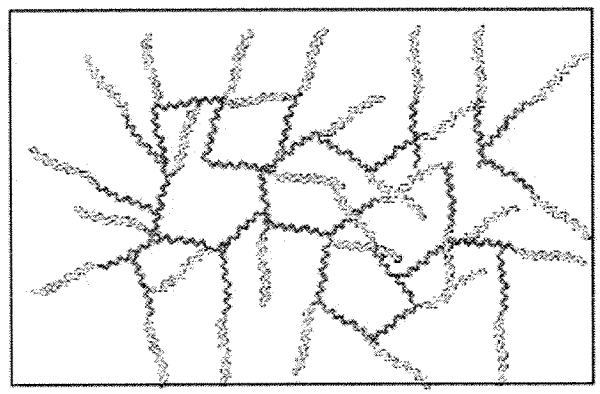

FIG. 3 represents the behavior of the diblock copolymers as a function of the temperature.

Diagram a) represents the behavior of the diblock copolymers at a temperature of less than "T": the polymeric segments A (light) are unfurled and the polymeric segments B (dark) are in the folded back/wound into a ball form. In this configuration, the viscosity of the electrolyte is not modified and the ionic conductivity in the electrolyte is normal.

Diagram b) represents the behavior of the diblock copolymers at a temperature greater than "T": the polymeric segment A (light) and the polymeric segment B (dark) are in the unfurled form. In this configuration, the electrolyte is in the gelled form and the ionic conductivity in the electrolyte is decreased, indeed even blocked.

Figure 4:
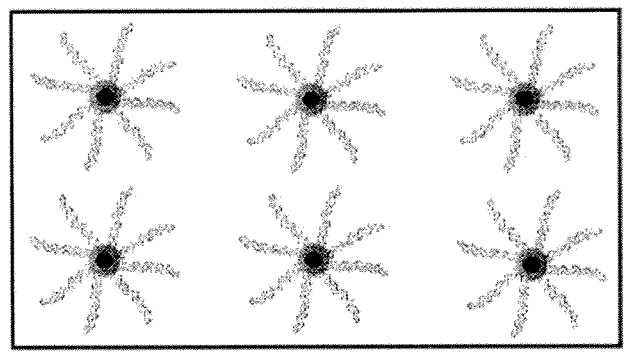
Figure 4:
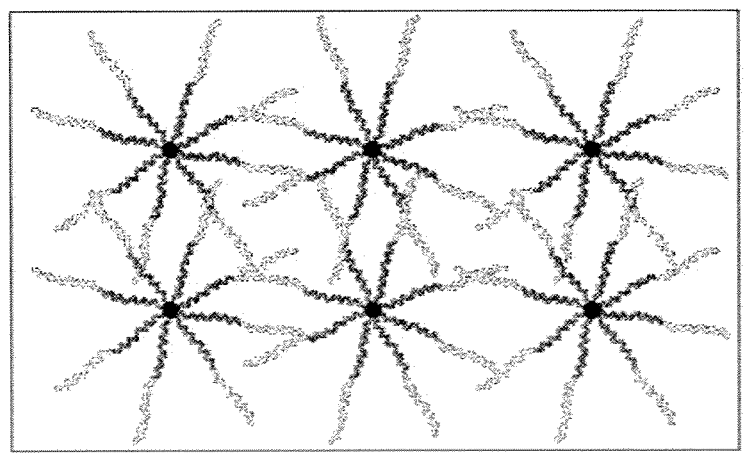

FIG. 4 represents the behavior of the triblock copolymers as a function of the temperature.

Diagram a) represents the behavior of the triblock copolymers at a temperature of less than "T": the polymeric segments A are unfurled, while the polymeric segments B and C are in the folded back/wound into a ball form. In this configuration, the viscosity of the electrolyte is not modified and the ionic conductivity in the electrolyte is normal.

Diagram b) represents the behavior of the triblock copolymers at a temperature greater than "T": the polymeric segments A and B are in the unfurled form, while the polymeric segments C are in the folded back/wound into a ball form. In this configuration, the electrolyte is in the gelled form and the ionic conductivity in the electrolyte is decreased, indeed even blocked.

DETAILED DESCRIPTION

As mentioned above, the polymeric segment A is soluble in said electrolyte, whatever the temperature; in particular, it is soluble at a temperature of less than "T".

The polymeric segment A advantageously makes possible the steric stabilization of the electrolyte and thus makes it possible to avoid the risks of sedimentation.

Preferably, the polymeric segment A has a molar mass ranging from 2000 g·mol$^{-1}$ to 300 000 g·mol$^{-1}$, preferably from 8000 g·mol$^{-1}$ to 80 000 g·mol$^{-1}$.

Preferably, the polymeric segment A exhibits a degree of polymerization $DP_A$ of greater than 10, preferably of greater than 20 and more particularly ranging from 50 to 800.

Any polymer soluble in the electrolyte employed may be used as polymeric segment A.

According to a preferred form, the polymeric segment A is chosen from the following polymers: polyacrylates, polymethacrylates, polycarbonates, polyester carbonates, polylactones, polylactams, polyesters, polyethers, soluble homopolymers and random copolymers of polyethers, in particular of polyoxyethylene, polyoxypropylene or polyoxybutylene, and also the copolymers of these polymers or corresponding monomers.

The polymeric segment A is in particular obtained from at least one monomer forming the following polymers: polyacrylates, polymethacrylates, polycarbonates, polyester carbonates, polylactones, polylactams, polyesters, polyethers, soluble homopolymers and random copolymers of polyethers, in particular of polyoxyethylene, polyoxypropylene or polyoxybutylene, and also the copolymers of these polymers or corresponding monomers.

The polymeric segment A may thus be composed of monomers of the same nature or of monomers of different natures.

According to a particularly preferred form, the polymeric segment A is a polymer chosen from polycarbonates, polyethers and their copolymers.

The block copolymer used in the present invention additionally comprises at least one polymeric segment B having a temperature for dissolution "T" in said electrolyte.

"Temperature for dissolution" within the meaning of the present application is understood to mean a temperature above which said polymer is soluble in the medium used, in particular in the electrolyte employed.

Preferably, the polymeric segment B has a molar mass ranging from 2000 g·mol$^{-1}$ to 300 000 g·mol$^{-1}$ preferably from 8000 g·mol$^{-1}$ to 80 000 g·mol$^{-1}$.

Preferably, the polymeric segment B exhibits a degree of polymerization $DP_B$ of greater than 10, preferably of greater than 20 and more particularly ranging from 50 to 800.

According to a preferred form, the polymeric segment B is a polymer obtained from at least one monomer chosen from the following monomers: acrylic and methacrylic acids, N-alkylacrylamides or N-alkylmethacrylamides, in particular N-isopropylacrylamide, N-isopropylmethacrylamide or N,N'-diethylacrylamide, saccharides, vinylidene fluoride or hexafluoropropylene.

According to a particularly preferred form, the polymeric segment B is a polymer chosen from poly(N-alkylacrylamides), poly(N-alkylmethacrylamides), polysaccharides, polyvinylidene fluoride (PVDF) and poly(vinylidene fluoride-hexafluoropropylene) copolymers (PVDF-HFP).

Advantageously, the polymeric segments B/ polymeric segments A molar ratio is greater than 0.5 and preferably ranges from 1 to 10 and more preferably from 2 to 5.

Advantageously, the block copolymer comprises at least one polymeric segment C which is insoluble in the electrolyte. More specifically, the polymeric segment C is insoluble in the electrolyte whatever the temperature; in particular, it is insoluble at a temperature of greater than "T".

Without wishing to be committed to any one theory, the polymeric segment C contributes to the creation of cross-linking nodes which will stabilize the network formed by the block copolymers and thus improve the structure of the gel. The polymeric segment C makes it possible to increase the elastic modulus of the gel.

In addition, the presence of polymeric segments C in the block copolymer makes it possible to use said block copolymer in the electrolyte in a reduced amount without the stability of the electrolyte in the gelled form being detrimentally affected.

Preferably, the polymeric segment C is chosen from saturated or unsaturated and branched or unbranched polyolefins, in particular poly($C_2$-$C_{12}$ olefins), polystyrene and their mixtures and their copolymers.

Advantageously, the polymeric segments A/ polymeric segments C molar ratio ranges from 0.5 to 10 and preferably from 1 to 5.

Advantageously, the polymeric segments B polymeric segments C molar ratio ranges from 1 to 10 and preferably from 1 to 3.

According to a preferred form, the block copolymer(s) is/are present in an amount ranging from 1 to 15% by weight, with respect to the total weight of the electrolyte.

The electrolyte used according to the invention comprises at least one lithium salt. The lithium salts may be chosen from any lithium compound capable of being dissociated in an organic solvent to produce lithium ions. Mention may be made, as examples of these lithium compounds, of $LiClO_4$, $LiBF_4$, $LiPF_6$, $LiCF_3SO_3$ or $LiN(CF_3SO_2)_2$.

The electrolyte used according to the invention may comprise any organic solvent generally used in the manufacture of a lithium electrochemical battery; in particular, the solvent is chosen from ethylene carbonate, propylene carbonate, dimethyl carbonate, ethyl methyl carbonate, diethyl carbonate, tetrahydrofuran, tetraethylene glycol dimethyl ether, dimethyl ether, dioxolane, dioxane, polyethylene glycol dimethyl ether and/or nitriles or their mixture(s).

Thus, the ionic conduction is provided by the electrolyte containing a solvent, or a mixture of solvents, and comprising the copolymer and lithium salts.

The example which follows illustrates the invention without limiting the scope thereof.

EXAMPLE

An electrolyte for a lithium-ion battery was prepared by adding, to an EC/PC/DMC $(1/1/3)_{mol}$+1M LiTFSI (LiN$(CF_3SO_2)_2$) mixture, a copolymer comprising the following polymeric segments A, B and C:

Segment A: polyacrylate (10 000 g·mol$^{-1}$)
Segment B: poly((n-butyl)methacrylamide 50 000 g·mol$^{-1}$)
Segment C: polyethylene (15 000 g·mol$^{-1}$).

The temperature for dissolution of the polymeric segment B also corresponds to the gelling of 80° C.

The invention claimed is:

1. An electrolyte for a lithium-ion battery comprising at least one block copolymer, wherein said block copolymer comprises at least one polymeric segment A which is soluble in said electrolyte and at least one polymeric segment B having a temperature for dissolution "T" in said electrolyte, the polymeric segments A and B being present in amounts sufficient to make possible an increase in the viscosity of the electrolyte at a temperature greater than or equal to the temperature "T", and then the return of the electrolyte to a liquid state when the temperature of the electrolyte falls back below T, wherein the block copolymer comprises at least one polymeric segment A chosen from the following polymers: polyacrylates, polymethacrylates, polycarbonates, polyester carbonates, polylactones, polylactams, polyesters, polyethers, soluble homopolymers and random copolymers of polyethers, wherein the block copolymer comprises at least one polymeric segment B obtained from at least one monomer chosen from the following monomers: acrylic and methacrylic acids, N-alkylacrylamides or N-alkylmethacrylamides saccharides, vinylidene fluoride or hexafluoropropylene, wherein the at least one polymeric segments B/ the at least one polymeric segments A molar ratio being greater than 0.5, and wherein the electrolyte comprises at least one lithium salt and at least one organic solvent chosen from ethylene carbonate, propylene carbonate, dimethyl carbonate, ethyl methyl carbonate, diethyl carbonate, tetrahydrofuran, tetraethylene glycol dimethyl ether, dimethyl ether, dioxolane, dioxane, polyethylene glycol dimethyl ether and/or nitriles or their mixture(s).

2. The electrolyte as claimed in claim 1 wherein the increase in the viscosity of the electrolyte is up to gelling of the electrolyte.

3. The electrolyte as claimed in claim 1, wherein the temperature T is less than or equal to 80° C.

4. The electrolyte as claimed in claim 1, in which the gelling of the electrolyte corresponds to a viscosity V at least greater than 10 Pa.s at 25° C.

5. The electrolyte as claimed in claim 1 exhibiting a conductivity C1 ranging from $10^{-4}$ S.cm$^{-1}$ to 0.1 S.cm$^{-1}$ at a temperature of less than T.

6. The electrolyte as claimed in claim 1, exhibiting a conductivity C2 of less than $10^{-5}$ S.cm$^{-1}$ at a temperature equal to or greater than T.

7. The electrolyte as claimed in claim 1, in which the block copolymer comprising at least one polymeric segment B is a polymer chosen from poly(N-alkylacrylamides), poly(N-alkylmethacrylamides), polysaccharides, polyvinylidene fluoride and poly(vinylidene fluoride-hexafluoropropylene) copolymers.

8. The electrolyte as claimed in claim 1, in which the block copolymer comprises at least one polymeric segment C which is insoluble in the electrolyte.

9. The electrolyte as claimed in claim 8 in which the block copolymer comprises at least one polymeric segment C chosen from saturated or unsaturated and branched or unbranched polyolefins.

10. The electrolyte as claimed in claim 8, comprising a block copolymer in which the polymeric segments A/ polymeric segments C molar ratio ranges from 0.5 to 10.

11. The electrolyte as claimed in claim 8, comprising a block copolymer in which the polymeric segments B/ polymeric segments C molar ratio ranges from 1 to 10.

12. The electrolyte as claimed in claim 1, in which the block copolymer(s) is/are present in an amount ranging from 1 to 15% by weight, with respect to the total weight of the electrolyte.

13. The electrolyte as claimed in claim 8, in which the block copolymer(s) is/are present in an amount ranging from 1 to 15% by weight, with respect to the total weight of the electrolyte.

14. A lithium-ion battery comprising the electrolyte as claimed in claim 1.

15. A lithium-ion battery comprising the electrolyte as claimed in claim 8.

16. Method for modulating the ionic conductivity of the electrolyte of a lithium-ion battery as a function of the temperature of said electrolyte, the method includes the step of using at least one block copolymer wherein said block copolymer comprises at least one polymeric segment A and at least one polymeric segment B such that said polymeric segment A is soluble in the electrolyte and said polymeric segment B has a temperature for dissolution "T" in said electrolyte, the polymeric segments A and B being present in amounts sufficient to make possible an increase in the viscosityof the electrolyte at a temperature greater than or equal to the temperature "T" and then the return of the electrolyte to a liquid state when the temperature of the electrolyte falls back below T,
> wherein the block copolymer comprises at least one polymeric segment A chosen from the following polymers: polyacrylates, polymethacrylates, polycarbonates, polyester carbonates, polylactones, polylactams, polyesters, polyethers, soluble homopolymers and random copolymers of polyethers,
>
> wherein the block copolymer comprises at least one polymeric segment B obtained from at least one monomer chosen from the following monomers: acrylic and methacrylic acids, N-alkylacrylamides or N-alkylmethacrylamides saccharides, vinylidene fluoride or hexafluoropropylene,
>
> wherein the at least one polymeric segments B/ the at least one polymeric segments A molar ratio being greater than 0.5, and
>
> wherein the electrolyte comprises at least one lithium salt and at least one organic solvent chosen from ethylene carbonate, propylene carbonate, dimethyl carbonate, ethyl methyl carbonate, diethyl carbonate, tetrahydrofuran, tetraethylene glycol dimethyl ether, dimethyl ether, dioxolane, dioxane, polyethylene glycol dimethyl ether and/or nitriles or their mixture(s).

17. The method as claimed in claim 16 wherein the increase in the viscosity is up to gelling of the electrolyte.

18. The method as claimed in claim 16, in which, at the temperature T, the conductivity of the electrolyte passes from a value C1 ranging from $10^{-4}$ S.cm$^{-1}$ to 0.1 S.cm$^{-1}$ to a value C2 ranging from $10^{-6}$ S.cm$^{-1}$ to 10–5 S.cm$^{1}$.

19. A method for modulating the viscosity of a electrolyte as a function of the temperature of said electrolyte, the method includes the step of using at least one block copolymer wherein said block copolymer comprises at least one polymeric segment A and at least one polymeric segment B such that said polymeric segment A is soluble in the electrolyte and said polymeric segment B has a temperature for dissolution "T" in said electrolyte, the polymeric segments A and B being present in amounts sufficient to make possible an increase in the viscosity, preferably up to gelling, of the electrolyte at a temperature greater than or equal to the temperature "T" and then the return of the electrolyte to a liquid state when the temperature of the electrolyte falls back below T,
> wherein the block copolymer comprises at least one polymeric segment A chosen from the following polymers: polyacrylates, polymethacrylates, polycarbonates, polyester carbonates, polylactones, polylactams, polyesters, polyethers, soluble homopolymers and random copolymers of polyethers,
>
> wherein the block copolymer comprises at least one polymeric segment B obtained from at least one monomer chosen from the following monomers: acrylic and methacrylic acids, N-alkylacrylamides or N-alkylmethacrylamides saccharides, vinylidene fluoride or hexafluoropropylene,
>
> wherein the at least one polymeric segments B/ the at least one polymeric segments A molar ratio being greater than 0.5, and
>
> wherein the electrolyte comprises at least one lithium salt and at least one organic solvent chosen from ethylene carbonate, propylene carbonate, dimethyl carbonate, ethyl methyl carbonate, diethyl carbonate, tetrahydrofuran, tetraethylene glycol dimethyl ether, dimethyl ether, dioxolane, dioxane, polyethylene glycol dimethyl ether and/or nitriles or their mixture(s).

* * * * *